United States Patent [19]
Yapici

[11] Patent Number: 5,947,074
[45] Date of Patent: Sep. 7, 1999

[54] RECIPROCATING-PISTON MACHINE HAVING AN ADJUSTABLE WEIGHT-COMPENSATING DEVICE

[75] Inventor: Kurt Imren Yapici, Aachen, Germany

[73] Assignee: FEV Motorentechnik GmbH & Co. KG, Aachen, Germany

[21] Appl. No.: 08/914,219

[22] Filed: Aug. 19, 1997

[30] Foreign Application Priority Data

Aug. 22, 1996 [DE] Germany ........................ 296 14 589 U

[51] Int. Cl.$^6$ .................................................. F02B 75/06
[52] U.S. Cl. .................................. 123/192.2; 123/192.1
[58] Field of Search .............................. 123/192.1, 192.2

[56] References Cited

U.S. PATENT DOCUMENTS

| | | | |
|---|---|---|---|
| 1,640,634 | 8/1927 | Wise ........................................ | 123/192.1 |
| 5,131,355 | 7/1992 | Bukovics et al. ........................ | 123/192.2 |
| 5,588,407 | 12/1996 | von Essen et al. ...................... | 123/192.2 |
| 5,653,203 | 8/1997 | von Essen et al. ...................... | 123/192.2 |
| 5,794,493 | 8/1998 | Bollig et al. .............................. | 74/603 |

FOREIGN PATENT DOCUMENTS 44 41 798   6/1995   Germany .

Primary Examiner—Willis R. Wolfe
Assistant Examiner—Hai Huynh
Attorney, Agent, or Firm—Venable; Gabor J. Kelemen

[57] ABSTRACT

A reciprocating-piston machine includes a cylinder; a piston received in the cylinder for reciprocating motion therein; a crankshaft having a crankshaft axis and being torque-transmittingly connected to the piston; a control disk mounted on the crankshaft for rotation therewith in a plane of rotation; an elongated weight-compensating member having opposite ends and extending transversely to the crankshaft axis; a follower roller carried by the weight-compensating member and riding on a cam track of the control disk; a supporting arrangement supporting the weight-compensating member at its ends substantially coplanar with the plane of rotation of the control disk for guiding the weight-compensating member in displacements towards and away from said crankshaft; a spring arrangement included in the support arrangement for urging the weight-compensating member toward the crankshaft to press the follower roller against the cam track with a spring force; and an adjusting device for varying the spring force.

13 Claims, 5 Drawing Sheets

RECIPROCATING-PISTON MACHINE HAVING AN ADJUSTABLE WEIGHT-COMPENSATING DEVICE

CROSS REFERENCE TO RELATED APPLICATION

This application claims the priority of German Application No. 296 14 589.0 filed Aug. 22, 1996, which is incorporated herein by reference.

BACKGROUND OF THE INVENTION

In reciprocating-piston machines, particularly piston-type internal-combustion engines, for the compensation of free mass forces compensating masses are needed which are constituted by revolving unbalanced weights driven by gears coupled with the crankshaft. Such orbiting unbalanced weights may thus be arranged only at the end of a crankshaft in the engine block.

German Offenlegungsschrift (application published without examination) No. 44 41 789 to which corresponds U.S. Pat. No. 5,588,407 issued Dec. 31, 1996, discloses an arrangement in which the crankshaft carries cam disks whose cam tracks are in contact with compensating weights which are designed as pivotal arms extending transversely to and below the crankshaft axis. One end of the compensating weight is coupled with a torsion spring which is affixed to the engine block while the other end of the compensating weight may freely swing back and forth. The torsion spring holds the compensating weight against the cam track of the cam disk with the intermediary of a roller element. This arrangement has the advantage that in case of multi-cylinder in-line engines the compensating weights may be positioned within the crankcase in the region of the crankshaft ends. It is, however, a disadvantage of such an arrangement that if only two compensating weights are used for the entire engine, relatively large compensating masses have to be used with which correspondingly robust torsion springs have to be associated. Accordingly, high pressing forces between the roller element and the respective compensating weight and the associated cam track will result. Such conditions are not adapted for all modes of application. Further, because of the required length of the torsion spring it is not possible to assign a separate compensating weight to each engine piston.

SUMMARY OF THE INVENTION

It is an object of the invention to provide an improved weight-compensating device of the above-outlined type which is of compact construction and which, in a multi-cylinder, reciprocating-piston machine, makes possible to assign a compensating weight to selected pistons or to all pistons of the machine.

This object and others to become apparent as the specification progresses, are accomplished by the invention, according to which, briefly stated, the reciprocating-piston machine includes a cylinder; a piston received in the cylinder for reciprocating motion therein; a crankshaft having a crankshaft axis and being torque-transmittingly connected to the piston; a control disk mounted on the crankshaft for rotation therewith; an elongated weight-compensating member having opposite ends and extending transversely to the crankshaft axis; a follower roller carried by the weight-compensating member and riding on a cam track of the control disk; a supporting arrangement supporting the weight-compensating member at its ends for guiding the weight-compensating member in displacements towards and away from said crankshaft; a spring arrangement included in the support arrangement for urging the weight-compensating member toward the crankshaft to press the follower roller against the cam track with a spring force; and an adjusting device for varying the spring force.

The invention provides for the possibility to assign to each cylinder at least one weight-compensating member underneath the crankshaft. By means of a terminal support for the traverse-like weight-compensating member a leverage (mechanical advantage) is obtained, so that high contact forces between the follower roller and the cam track may be generated and thus small spring forces may equalize large mass forces. By providing a device for changing the spring bias, the contact force between the follower roller and the cam track may be set. Dependent upon the construction of the device, such a bias adjustment may be effected continuously or stepwise so that, starting from a small contact force at low rpm's (and accordingly small mass forces to be equalized), the contact force may be increased by means of increasing the spring tension, so that for high rpm's high contact forces may be set. It is an important advantage of the invention that for any given rpm the contact force responsible for the friction may be set to a magnitude which is just sufficient to ensure that the weight-compensating member and the follower roller do not lift off the control disk. Consequently, the stress on the material is correspondingly reduced. This means that in a piston-type internal-combustion engine a lesser starting torque applied by the starter motor is needed and also, the main bearings will be stressed less, thus reducing the friction in all the bearings of the engine.

While it is basically feasible to use a wide variety of mechanical spring elements such as bending springs or spring disk stacks to form the spring assembly, according to an advantageous feature of the invention the spring assembly is formed by at least one coil spring which may be a commercially available standardized compression spring. Coil springs, particularly compression coil springs have the additional advantage that their force line extends in the plane of movement of the weight-compensating members, so that the system structure may be relatively narrow and therefore practically no increase in the engine length is required.

Such coil springs too, may be continuously biased by the device for varying (adjusting) the spring tension.

According to another advantageous feature of the invention, the spring assembly is formed by at least two serially connected springs, preferably coil springs which have different spring characteristics (stiffness) and the springs are so arranged that in a first setting the softer spring and in a second setting the harder spring becomes effective. The soft setting applies to a lower rpm range while the hard setting is associated with an upper rpm range. Such a two-step system also simplifies the adjusting device which actuates the device for setting the spring tension. Within the stepped regions predetermined by the springs, a continuous adjustment of the spring tension is possible.

According to a further advantageous feature of the invention, the device for altering the spring tension is formed by a support assembly which is connected with an adjusting drive for changing the height position of the support assembly relative to the crankshaft. The height adjustment may be effected, for example, by means of a hydraulic piston on which the traverse of the support assembly and/or the spring assembly is supported. Or, the support assembly may include an eccentric rotatable by an adjusting drive.

According to another advantageous feature of the invention, the weight-compensating member is designed for pivotal motion; one end of the weight-compensating member is supported by a pivotal bearing, while its other end is supported by the spring assembly. The device for changing the spring tension may be either integrated in the pivotal bearing, for example, as an eccentric and/or may be associated with the spring assembly as a support. Such a support may be an eccentric, a hydraulic piston or the like. The pivotal design for the weight-compensating member results in a defined guidance which is simple to manufacture.

According to a further feature of the invention, the weight-compensating member is linearly shiftably supported on a guide and is, with the intermediary of spring assemblies, held at its ends on a supporting traverse which, in turn, is supported by at least one device for varying the spring tension.

Such an arrangement permits a strictly symmetrical design for the weight-compensating member. Further, because of a purely translatory motion of the weight-compensating member, no centrifugal forces of the weight-compensating members need to be taken into consideration even in the transverse direction. The device for changing the spring tension may be arranged either underneath the supporting traverse or at one end or both ends thereof. In case the devices for changing the spring tension are provided at both ends of the supporting traverse, it is, for example, feasible to obtain three setting ranges even in a two-point control by utilizing a different stroke. Thus, a first setting range may be set by a stroke $h_1$ of a first eccentric, a second setting range may be set by a stroke $h_2$ of a second eccentric and a third setting range may be set by a total stroke of $h=h_1+h_2$. Here too, within the stepped ranges a continuous change of the spring tension may be effected.

While in principle it is feasible to also guide the weight-compensating member by corresponding guides at the engine block in case a supporting traverse is used, it is expedient to couple the guide for the weight-compensating member directly with the supporting traverse so that the latter, together with the weight-compensating member and the spring assembly, constitutes an integrated structural unit.

According to a further advantageous feature of the invention, the spring assembly includes a coil spring for a first, soft setting and a magnet assembly for a second, hard setting. The magnet assembly is composed of two magnets with facing identical polarities. One of the magnets is stationary while the other is connected to the movable weight-compensating member. In such a system the force, with which the weight-compensating member is pressed against the control cam via the follower roller, is generated by the "electromagnetic gap stiffness" which, in such an elastic system, depends from the strength of the magnetic field of the two magnets which are oriented towards one another with identical polarities.

To effect a change of the "spring stiffness" of the system, according to an additional feature of the invention, one of the magnets is a permanent magnet, while the other is an electromagnet connected to a current source. Since the electromagnetic gap stiffness of such a magnet system depends from the intensity of the current flowing through the solenoid of the electromagnet, it is feasible to change the "spring tension" by suitably controlling the current flow. The arrangement may be such that the stationary magnet is the electromagnet while the other magnet—which moves as a unit back and forth with the weight-compensating member—is the permanent magnet. Since the electromagnet has a larger mass than the permanent magnet, the securement of the electromagnet to the weight-compensating member is advantageous because the mass of the electromagnet may be added as an "active" mass to the mass of the weight-compensating member.

Also, when using such "magnet springs" as the spring assembly, it is feasible to support only one end of the weight-compensating member by the spring arrangement and to support the other end of the weight-compensating member on a pivotal bearing. The device for changing the spring tension is integrated in the spring assembly as an electromagnet whose magnetic force may be varied. It is, however, also feasible to support both ends of the weight-compensating member by such magnetic springs in which case a purely translatory motion of the compensating mass is obtained.

While in principle it is basically feasible to utilize solely such magnetic springs, a combination of coil springs and magnetic springs, particularly in piston-type internal-combustion engines is advantageous because upon engine start and in the lower rpm range the contacting force between the weight-compensating member and its support may be applied exclusively by the coil spring which means that the electric system of the vehicle is not burdened at that time. The magnet springs are activated only at high rpm's when more current may be drawn from the electric system of the vehicle. In such an operational stage a continuous change of the spring tension is feasible by means of a suitable, rpm-dependent regulation of the current passing through the solenoid of the electromagnet.

DESCRIPTION OF THE PREFERRED EMBODIMENTS

Figure 1:
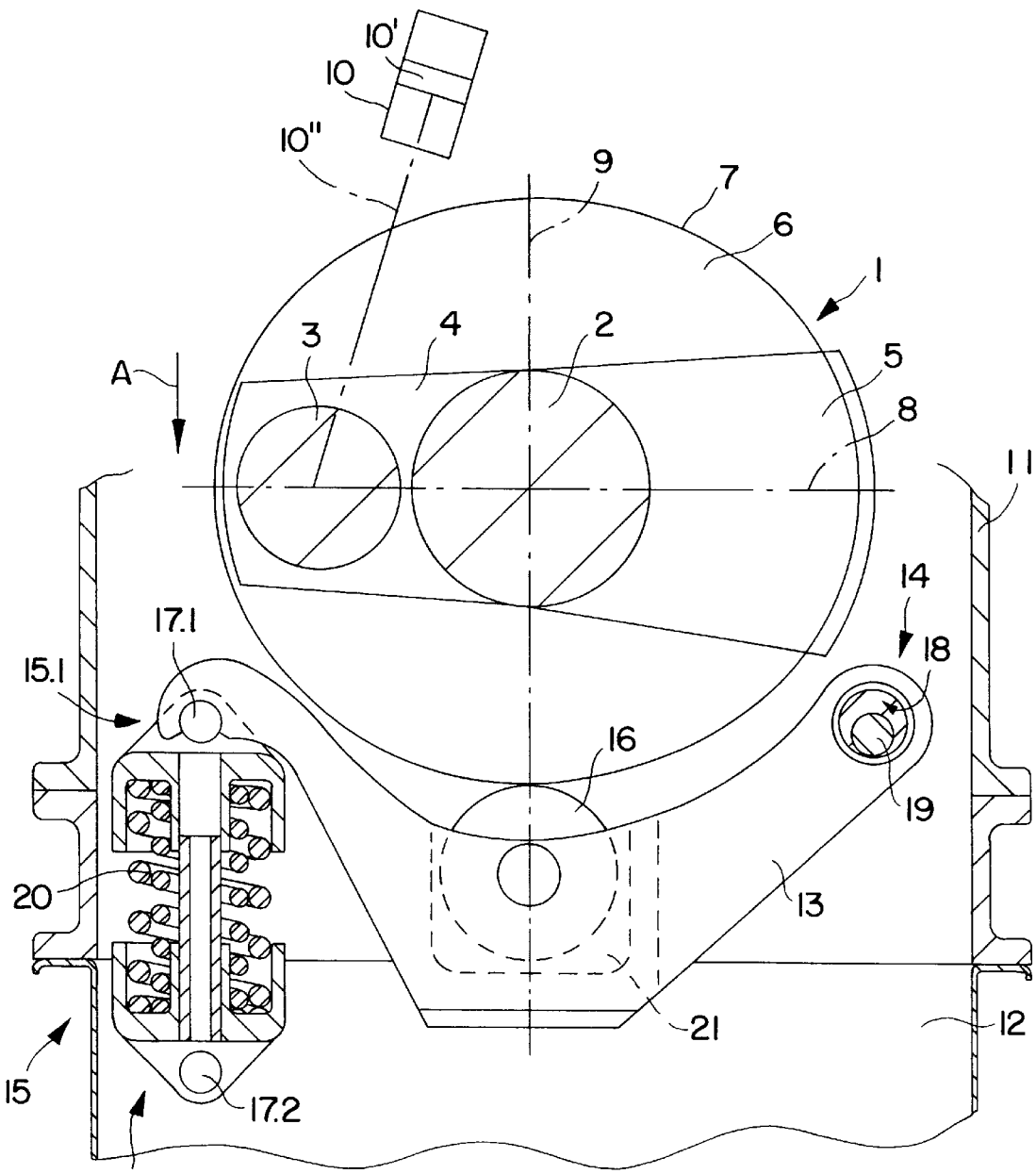
FIG. 1 is a partially sectional side elevational view of a preferred embodiment of the invention.

FIG. 1 shows in cross section a crankshaft 1 of a reciprocating piston-type internal-combustion engine. The crankshaft 1 has a main journal 2, a crank pin 3, a web 4 and a counterweight 5. The crankshaft 1 carries a cam disk (control disk) 6 having an elliptical cam track 7. The major axis 8 of the cam track 7 is oriented parallel to the crank arm while the minor axis 9 of the cam track 7 is oriented 90° thereto. A cylinder 10, a piston 10' reciprocating therein and a connecting rod 10" coupling the piston 10' to the crankshaft 1 are only symbolically illustrated.

In the crankcase 12 surrounded by the lower part of the engine block 11, underneath the crankshaft 1 a weight-compensating member (compensating mass) 13 is disposed. The weight-compensating member 13 is a traverse-like component which, as it may also be observed in FIG. 2, extends transversely to the orientation of the crankshaft axis and is supported at both ends in the plane of rotation of the control disk 6. A support for one end of the weight-compensating member 13 is formed by a pivot bearing 14 mounted on the engine block 11, while the other end is supported on the engine block 11 with the interposition of a spring assembly 15. The weight-compensating member 13 is provided with a follower roller 16 which rides on the cam track 7 of the control disk 6 with a pressing force which is determined by the spring force of the spring assembly 15.

While the upper end 15.1 of the spring assembly 15 is articulated to one end of the weight-compensating member 13, its lower end 15.2 is articulated to a fixed location 17.2 of the engine block 11.

To be able to vary the spring force (spring tension), the pivotal support 14 is formed as an eccentric so that the journal 18 of the weight-compensating member 13 is held eccentrically in a bearing body 19 which is rotatably supported in the engine block 11 and is coupled with an externally operable setting device. By suitably turning the rotary body 19, the pivotal axis of the weight-compensating member 13 defined by the journal 18 may be varied in its height relative to the crankshaft 1 and in this manner the bias of the spring assembly 15 which may be composed of linear or progressive coil springs 20 may be accordingly changed. By changing the spring tension, the contact force with which the follower roller 16 engages the cam track 7 thus also changes so that by turning the eccentric formed of the journal 18 and the rotary body 19, a "soft" or "hard" basic setting of the spring tension may be obtained.

Instead of designing the pivot bearing 14 to be height-adjustable by means of an eccentric, it is feasible to mount the fixed articulation point 17.2 of the spring assembly 15 on a settable eccentric.

In case of a multi-cylinder in-line engine, a change of the spring tension may be effected centrally by a rotary body 19 which extends along the entire length of the engine and on which, in a suitable orientation to the crank, the journal 18 of the compensating members 13 or the fixed support 17.2 of the spring assemblies 15 are eccentrically mounted, so that by means of a central adjustment an alteration of the spring tension for the weight-compensating members 13 at each cylinder is feasible.

Figure 2:
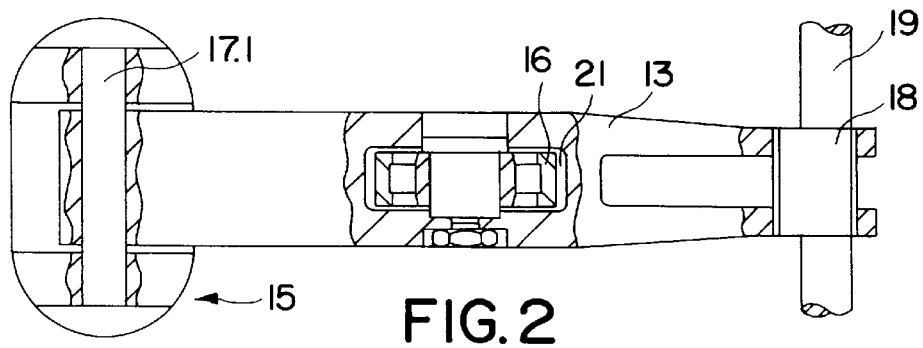
FIG. 2 is a partially sectional top plan view of one part of the structure of FIG. 1, as seen in the direction of arrow A of FIG. 1.

As may be observed in FIG. 2, the weight-compensating member 13 has in its mid zone a recess 21 accommodating the follower roller 16 which may be constituted by a conventional rolling-element bearing (ball bearing or roller bearing). By a suitable dimensioning of the size of the recess 21, it is feasible to insert a roller bearing having a load bearing capacity adapted for the highest engine rpm's. By means of the outer contour of the weight-compensating member 13, the size and thus the effective "balancing mass" may be adapted to the individual requirements.

Figure 3:
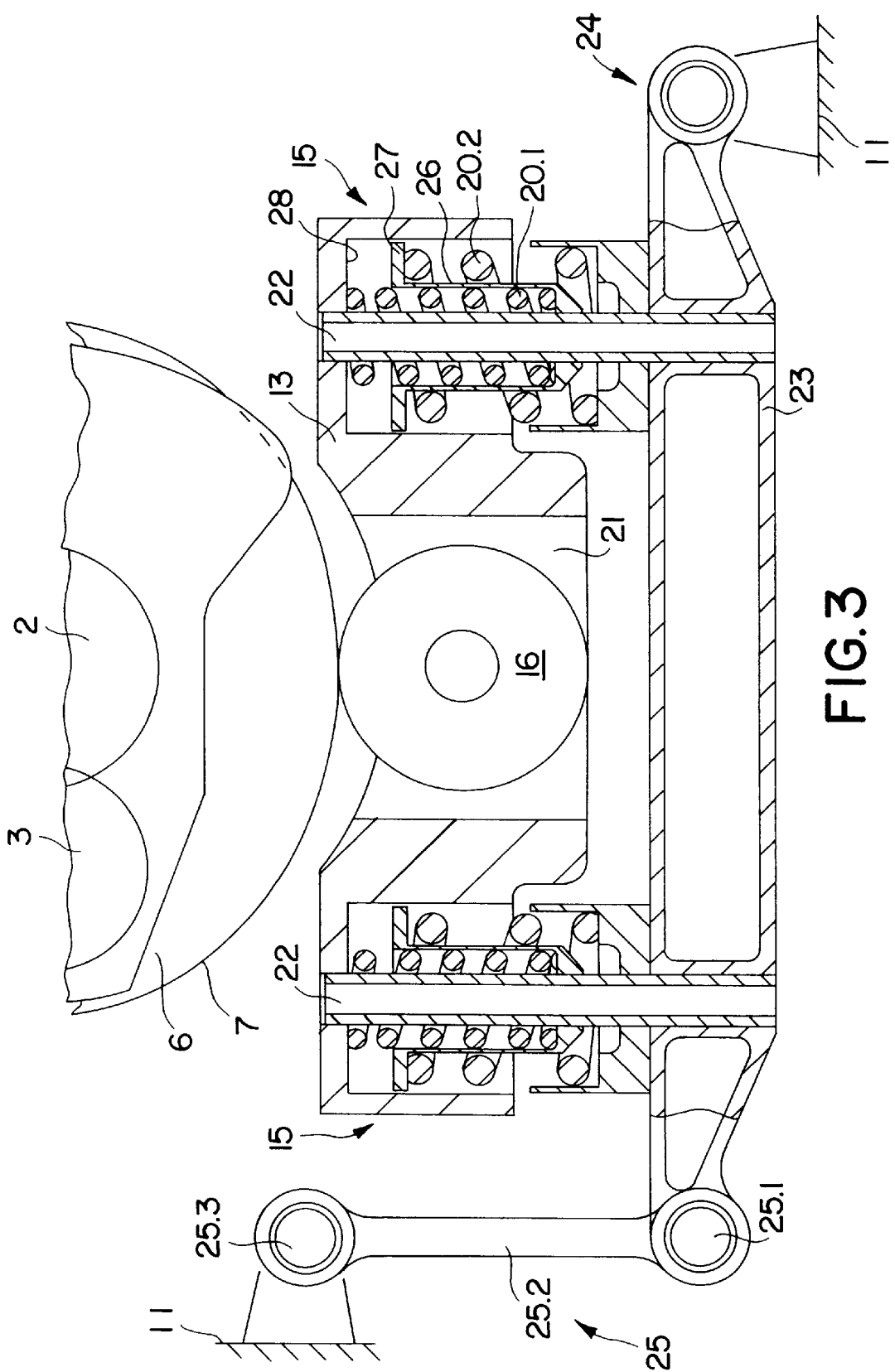
FIG. 3 is a partially sectional side elevational view of another preferred embodiment of the invention.

FIG. 3 shows another preferred embodiment which, in principle, is constructed similarly to that illustrated in FIGS. 1 and 2. The traverse-like weight-compensating member 13 is guided for translatory movement on a supporting traverse 23 by means of two guide bars 22 which may be tubular members. Both ends of the weight-compensating member 13 are supported on the supporting traverse 23 by spring assemblies 15. The supporting traverse 23 is, in turn, supported on the engine block 11 by means of a fixed rotary bearing 24 at one end and by a floating bearing 25 at the other end. The floating bearing 25 is composed of a joint 25.1, an arm 25.2 and a fixed rotary bearing 25.3 which is supported on the engine block 11.

For changing the spring tension, the fixed rotary bearing 24 and/or 25.3 may be constituted by an eccentric as described in connection with FIG. 1 for the pivotal bearing 14, and may be connected with a suitable setting device so that by means of turning the eccentric (not shown in FIG. 3), the height position of the location of articulation with respect to the crankshaft axis may be changed and thus the spring bias may be altered.

By using only a single eccentric, for example, in the bearing (joint) 24 or 25.3, an adjustment between two different height positions is possible. When using eccentrics integrated in both joints 24 and 25.3, it is possible to preset three different height positions if the eccentricities of the eccentrics associated with the respective joints 24 and 25.3 are different. If, for example, the eccentric of the joint 24 has an eccentricity of $h_1$ which is less than the eccentricity $h_2$ of the eccentric associated with the joint 25.3, then a height adjustment having a magnitude of $h_1$ or $h_2$ or $h=h_1+h_2$ and thus a corresponding change of the spring bias may be selectively set.

In the embodiment according to FIG. 3 it is assumed that only one of the joints 24 or 25.3 is provided with an eccentric while the other joint is formed merely by a simple, stationary bearing stub. Each of the two spring assemblies 15 is composed of two compression coil springs 20.1 and 20.2 which are connected in series. The two compression coil springs 20.1 and 20.2 are connected with one another by a cap-like coupling body 26 where in the shown "low" height adjustment by the setting means, for example, the eccentric at the joint 24 or 25.3, only the soft spring 20.1 is effective. The spring forces effective upon upward and downward motion of the weight-compensating member 13 are, nevertheless, transmitted to the supporting traverse 23 via the cap-like coupling body 26 and the hard spring 20.2. The difference in the spring stiffness of the two springs is, however, of such a magnitude relative to one another that despite the series connection of the two springs, essentially only the soft spring 20.1 is resiliently effective.

If now at higher rpm's the system should have harder spring characteristics, then by means of a suitable adjusting arrangement at the joints 24 and/or 25.3, the supporting traverse 23 is raised to such an extent that the abutment face 27 of the cap-shaped coupling body 26 engages the counterface 28 in the corresponding recess of the weight-compensating member 13 so that during the upward and downward motions of the weight-compensating member 13 imparted thereon by the cam track 7, only the "hard" spring 20.2 is effective between the weight-compensating body 13 and the supporting traverse 23.

As it may be further seen in FIG. 3, the compensating member 13 is provided with a recess 21 in which a follower roller 16 is arranged. The follower roller 16 may be a standard rolling-element bearing (ball bearing or roller bearing). Since the recess 21 is downwardly open, the oil mist present in any event in the crankcase may be utilized for lubricating the follower roller 16 as well as the locations between the weight-compensating member 13 and its guides 22.

Figure 4:
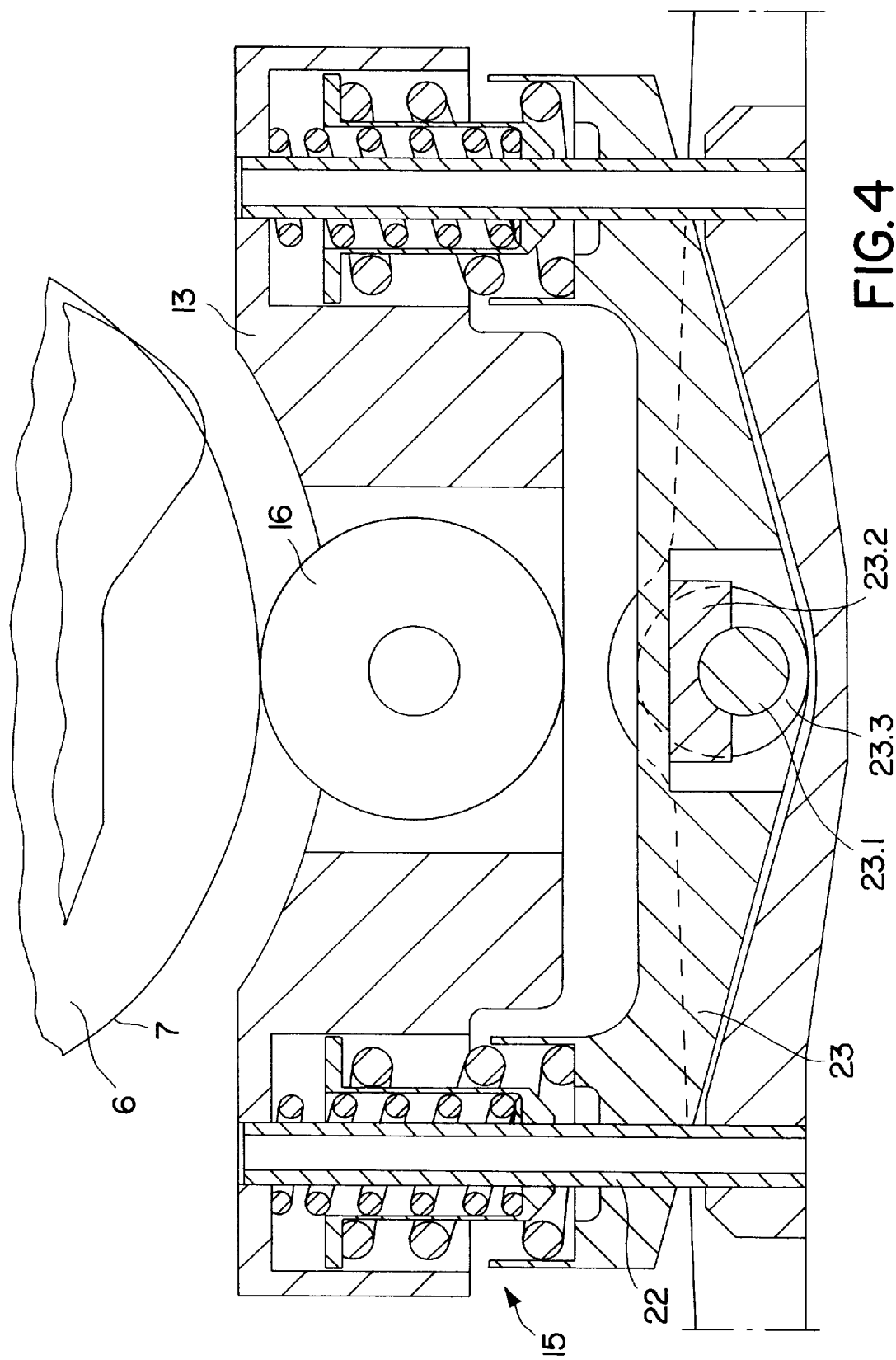
FIG. 4 is a partially sectional side elevational view of a further preferred embodiment of the invention.

The embodiment illustrated in FIG. 4 is a variant of that shown in FIG. 3. In the FIG. 4 embodiment, the traverse-like compensating member 13 is guided for executing a translational motion on a supporting traverse 23 by means of bar guides 22 which may be tubular. The construction and mode of operation of the spring assemblies 15 correspond to those of the embodiment described in connection with FIG. 3.

In the FIG. 4 embodiment, the supporting traverse 23 is supported by means of a central setting eccentric 23.1 and a slide block 23.2. In the event a plurality of weight-compensating members are present along the crankshaft 1, the setting eccentrics 3.1 associated with the individual weight-compensating members are mounted on a common shaft 23.3 which extends along the entire length of the engine so that by means of a central setting all the weight-compensating members arranged in the engine may be simultaneously adjusted by a central adjusting device.

Figure 5:
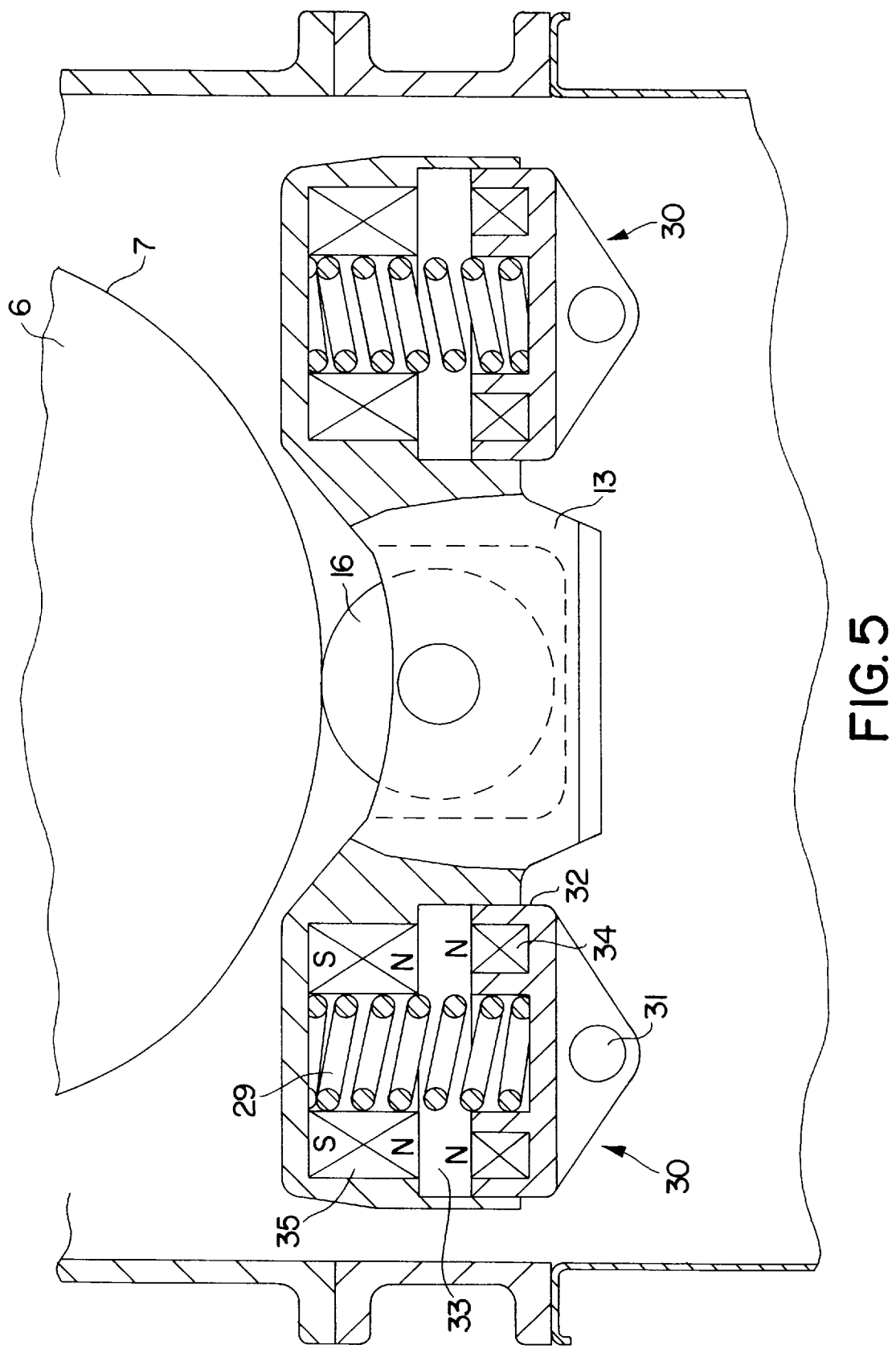
FIG. 5 is a partially sectional side elevational view of yet another preferred embodiment of the invention.

FIG. 5 shows a variant which, however, essentially corresponds to the earlier-described embodiments. In this embodiment too, a control disk 6 is provided which has a cam track 7 engaged by a follower roller 16 of a weight-compensating member 13 which is provided at both ends with a compression coil spring 29 supporting the weight-compensating member 13 on a supporting and guiding element 30. The supporting and guiding element 30 is, in turn, supported by pins 31 on the engine block and projects with its outer surface 32 in a piston-like manner into a cavity 33 of the weight-compensating member 13 to thus provide for a guidance which is not prone to misalignments.

Each supporting and guiding element 30 is provided with a solenoid 34 connected to a current supply (not shown) Thus, the supporting and guiding element 30 forms an electromagnet cooperating with an annular permanent magnet 35 held in the weight-compensating member 13. The permanent magnet 35 may also be formed by a plurality of bar-shaped magnets arranged generally in an annular pattern.

In the illustrated arrangement of the permanent magnet 35 that is, where the pole face of the permanent magnet 35 is oriented towards the supporting and guiding element 30 has an N polarity, the solenoid of the supporting and guiding element 30 has to be energized with a D.C. current such that at the pole face of the electromagnet 34 also an N polarity will appear, whereby the two magnets repel each other. As a result of such an arrangement, when the supporting and guiding element (electromagnet) 30 is energized, it resiliently presses the weight-compensating member 13 against the cam track 7 via the follower roller 16 with a resilient force which is proportional to the current flow. The spring formed by the magnetic arrangement has, based on the gap stiffness, a pronounced progressive characteristic which, however, can be altered steplessly by regulating the current passing through the solenoid 34.

In the system of FIG. 5, the coil spring 29 constitutes the "soft" spring which is to be effective in the lower rpm ranges, during which no current passes through the solenoid 34 of the electromagnet. When a predetermined rpm is exceeded, the solenoid 34 is energized such that the current intensity is increased in accordance with the rpm increase or is lowered so that the optimal, operationally dependent resetting forces may be set for the weight-compensating member 13.

The various embodiments described above concerning the yielding support for the weight-compensating member 13 may be utilized for various embodiments in a number of combinations. Thus, for example, the magnet embodiment of FIG. 4 may be used to support the weight-compensating member 13 of the FIG. 1 embodiment. In such a case the device formed as an eccentric for varying the height position at the pivotal bearing 14 may be omitted because the adjustment of the spring bias may be affected by altering the current flow through the solenoid of the electromagnet. Likewise, the tandem spring assemblies of FIG. 3 with the devices for activating the soft spring for low rpm's and the hard spring for higher rpm's may be used in the construction of FIG. 1. Or, it is feasible to utilize the simple spring arrangement of FIG. 1 in the embodiment illustrated in FIG. 3.

Figure 6:
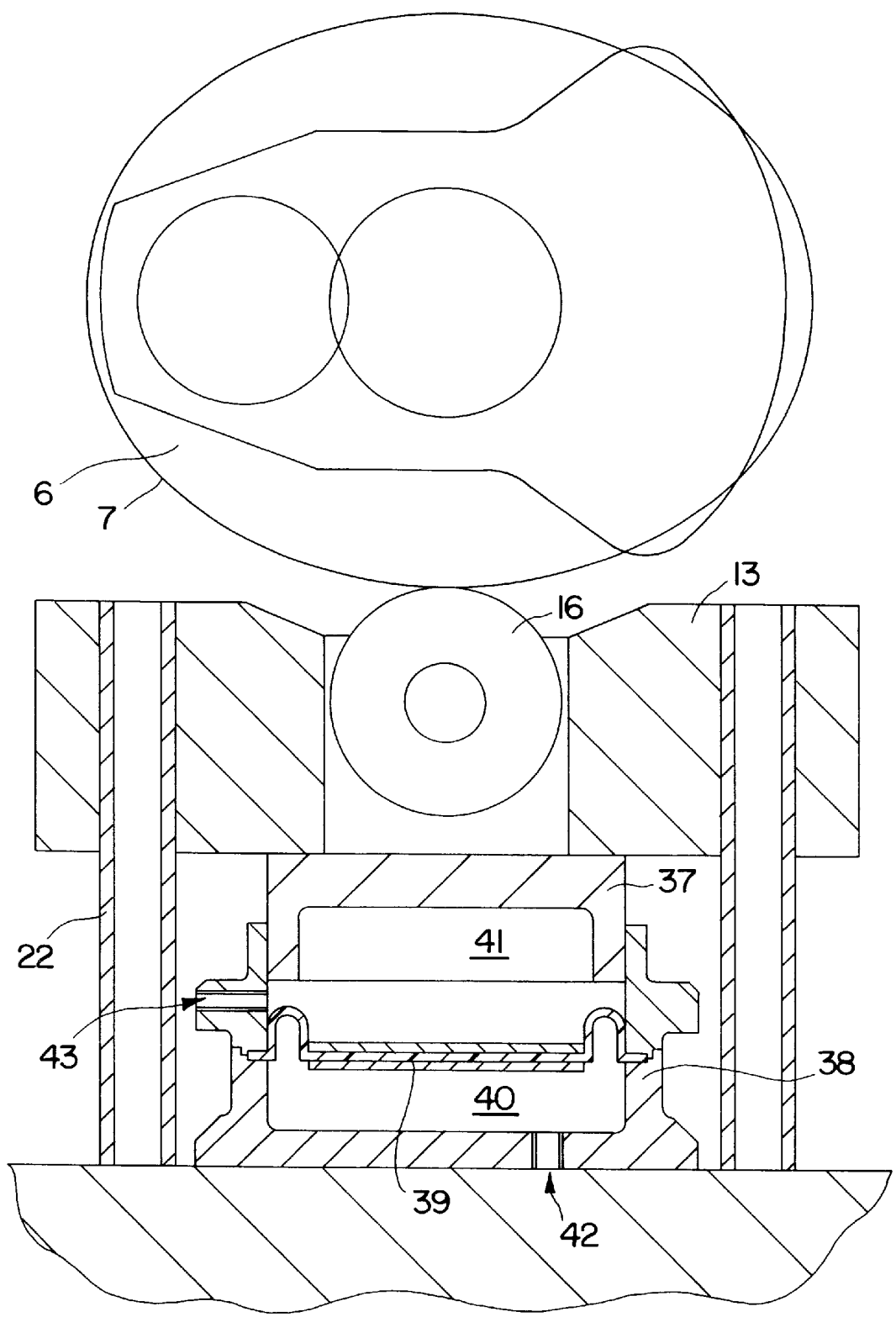
FIG. 6 is a partially sectional side elevational view of still another preferred embodiment of the invention.

FIG. 6 illustrates an embodiment which has a hydropneumatic spring assembly. The weight-compensating member 13 is guided for translational motion over guides 22 and engages the cam track 7 of the control disk 6 by means of the follower roller 16. The supporting arrangement 36 for the compensating member 13 is formed by a hydro-pneumatic spring assembly including a piston 37 which is guided in a cylinder 38 which is subdivided by a diaphragm 39 into a pneumatic chamber 40 and a hydraulic chamber 41. The pneumatic chamber 40 is connected by means of a port 42 with a controllable pneumatic pressure generator (not shown), while the hydraulic chamber 41 is connected by means of a port 43 with a controllable hydraulic pressure generator (not shown). By charging the pneumatic chamber 40, the desired spring force is set, while the fluid in the hydraulic chamber 41 serves as a transmission and coupling means between the piston 37 and the diaphragm 39 in order to obtain a more favorable loading of the diaphragm 39. The piston 37 is guided in the cylinder 38 without additional seals so that slight losses in the hydraulic liquid (such as engine oil) may occur. Leakage losses are supplemented by the conduit 43. By means of a suitable actuation of the pressure generator for the hydraulic liquid and the pressure generator for the pneumatic medium, such as air, the "spring stiffness" of the hydro-pneumatic spring assembly and thus the pressing force between the follower roller 16 and the cam track 7 may be set by the pneumatic pressure level dependent upon engine operation. Since the hydraulic liquid, such as engine oil, serves merely as a transmission and coupling medium between the diaphragm 39 and the piston 37, in the pneumatic chamber 40 and the hydraulic chamber 41 identical pressures prevail.

The above-described hydro-pneumatic spring assembly may also be provided in a tandem arrangement, that is, the weight-compensating member 13 may be supported by means of two endwise arranged hydro-pneumatic spring arrangements of the type described above. A support as shown in FIG. 1 may be obtained by means of a hydro-pneumatic spring arrangement which does not need an eccentric for supporting the weight-compensating member 13. It is sufficient to provide a simple pivotal support because the device for changing the spring tension by controlling the pressure in the pneumatic chamber is integrated in the spring arrangement.

It will be understood that the above description of the present invention is susceptible to various modifications, changes and adaptations, and the same are intended to be comprehended within the meaning and range of equivalents of the appended claims.

What is claimed is:

1. A reciprocating-piston machine comprising
   (a) a cylinder;
   (b) a piston received in said cylinder for reciprocating motion therein;
   (c) a crankshaft having a crankshaft axis; said crankshaft being torque-transmittingly connected to said piston;
   (d) a control disk mounted on said crankshaft for rotation therewith; said control disk having a cam track;
   (e) an elongated weight-compensating member having opposite ends and extending transversely to said crankshaft axis;
   (f) a follower roller carried by said weight-compensating member and riding on said cam track;
   (g) support means supporting said weight-compensating member at said ends thereof for guiding said weight-compensating member for displacements towards and away from said crankshaft;

(h) spring means included in said support means for urging said weight-compensating member toward said crankshaft to press said follower roller against said cam track with a spring force; and (i) adjusting means for varying said spring force.

2. The reciprocating-piston machine as defined in claim 1, wherein said spring means comprises a mechanical spring.

3. The reciprocating-piston machine as defined in claim 2, wherein said spring means comprises first and second springs having different spring characteristics; and connecting means for serially coupling said first and second springs to one another; said adjusting means including setting means for placing said spring means into a first state in which solely said first spring is effective and for placing said spring means into a second state in which solely said second spring is effective.

4. The reciprocating-piston machine as defined in claim 1, wherein said support means comprises a supporting mechanism supporting at least one of said ends of said weight-compensating member; and further wherein said adjusting means comprises a setting device connected to said supporting mechanism for raising and lowering said supporting mechanism relative to said crankshaft.

5. The reciprocating-piston machine as defined in claim 1, wherein said support means comprises a supporting mechanism for pivotally supporting said weight-compensating member at one end thereof; said spring means including a spring assembly forming part of said support means and supporting the other end of said weight-compensating member.

6. The reciprocating-piston machine as defined in claim 1, wherein said support means includes a supporting traverse extending parallel to and spaced from said weight-compensating member and a guiding device supporting said weight-compensating member for linear displacements towards and away from said crankshaft; said spring means comprising two spring assemblies connected between said supporting traverse and said weight-compensating member at said ends thereof for urging said weight-compensating member from said supporting traverse towards said crankshaft; said adjusting means being connected to said supporting traverse for supporting said supporting traverse and for altering a position thereof towards and away from said said weight-compensating member.

7. The reciprocating-piston machine as defined in claim 6, said guiding device extending from said supporting traverse.

8. The reciprocating-piston machine as defined in claim 6, wherein said adjusting means comprises means connected to an end of said supporting traverse for varying the spring force.

9. The reciprocating-piston machine as defined in claim 1, wherein said spring means comprises (a) a first magnet being stationarily supported;

(b) a second magnet carried by said weight-compensating member; said first and second magnets having identical polarities oriented toward one another for causing said second magnet to be urged away from said first magnet; said first and second magnets forming a magnet assembly having a first spring characteristic;

(c) a coil spring having a second spring characteristic being softer than said first spring characteristic; said coil spring being supported at one spring end and engaging said weight-compensating member at an opposite spring end for urging said weight-compensating member towards said crankshaft; and (d) means for selectively rendering said magnet assembly inoperative or operative for giving said spring means a relatively soft or a relatively hard spring characteristic, respectively.

10. The reciprocating-piston machine as defined in claim 1, wherein said spring means comprises (a) a first magnet being stationarily supported;

(b) a second magnet carried by said weight-compensating member; said first and second magnets having identical polarities oriented toward one another for causing said second magnet to be urged away from said first magnet; said first and second magnets forming a magnet assembly having a first spring characteristic; one of said first and second magnets being a permanent magnet and the other of said first and second magnets being an electromagnet;

(c) a coil spring having a second spring characteristic being softer than said first spring characteristic; said coil spring being supported at one spring end and engaging said weight-compensating member at an opposite spring end for urging said weight-compensating member towards said crankshaft; and (d) means for selectively placing said electromagnet into a de-energized stare or into an energized state for rendering said magnet assembly inoperative or operative to give said spring means a relatively soft or a relatively hard spring characteristic, respectively.

11. The reciprocating-piston machine as defined in claim 1, wherein said support means, said spring means and said adjusting means are together composed of a hydropneumatic spring assembly supporting said weight-compensating member and urging said weight-compensating member towards said crankshaft; said hydro-pneumatic spring assembly including (a) a pneumatic chamber;

(b) means for supplying a controllable pneumatic pressure to said pneumatic chamber;

(c) a hydraulic chamber; and (d) means for supplying a controllable hydraulic pressure to said hydraulic chamber.

12. The reciprocating-piston machine as defined in claim 11, wherein said hydro-pneumatic spring assembly further comprises (e) a diaphragm separating said pneumatic chamber from said hydraulic chamber; and (f) a piston slidably received in said hydraulic chamber for closing said hydraulic chamber and for being exposed to a hydraulic pressure therein; said piston being attached to said weight-compensating member.

13. The reciprocating-piston machine as defined in claim 1, wherein said control disk has a plane of rotation and further wherein said support means support said weight-compensating member at said ends thereof substantially coplanar with said plane of rotation.

* * * * *